United States Patent [19]
Fukunaga et al.

[11] Patent Number: 5,469,746
[45] Date of Patent: Nov. 28, 1995

[54] ELECTROMAGNETIC FLOW METER

[75] Inventors: Masao Fukunaga; Yutaka Sakurai, both of Katsuta; Kouji Saito, Mito; Tamio Ishihara, Katsuta, all of Japan

[73] Assignee: Hitachi, Ltd., Tokyo, Japan

[21] Appl. No.: 215,339

[22] Filed: Mar. 21, 1994

[30] Foreign Application Priority Data

Mar. 30, 1993 [JP] Japan .................................. 5-071462

[51] Int. Cl.⁶ ..................................................... G01F 1/00
[52] U.S. Cl. ..................................... 73/861.12; 73/861.46
[58] Field of Search ............................ 73/861.2, 861.13, 73/861.15, 861.16, 861.17; 340/870.02

[56] References Cited

U.S. PATENT DOCUMENTS

| | | | |
|---|---|---|---|
| 4,520,488 | 5/1985 | Hoowvig et al. | 375/5 |
| 4,676,112 | 6/1987 | Uematsu et al. | 73/861.17 |
| 4,797,669 | 1/1989 | McGowan, III et al. | 340/870.40 |
| 4,806,905 | 2/1989 | McGowan, III et al. | 340/310 R |
| 5,207,105 | 5/1993 | Fukunaga et al. | 73/861.12 |

Primary Examiner—Richard E. Chilcot, Jr.
Assistant Examiner—Ronald L. Biegel
Attorney, Agent, or Firm—Kenyon & Kenyon

[57] ABSTRACT

An electromagnetic flow meter for industries includes a transducer and a signal processor provided separately from the transducer. The transducer having an exciting circuit, an amplifying and calculating part and a transmitting part outputs an analog flow rate signal and digital signals which are superimposed to the an analog flow rate signal to the signal processor. The analog signal sent to the signal processor is passed through the signal processor without receiving any signal processing and the digital signals are sent into the transducer or taken into the signal processor through alternating current coupling means. The data transmission is diagnosed by checking the conformity between the data stored in the signal sending part and the received data. Data set in a data setting part provided in the signal processor are sent to the transducer through a transmitting cable in which the flow rate data are also transmitted.

28 Claims, 13 Drawing Sheets

FIG. 8

| No | ITEM | CONFORMITY IN DATA |
|---|---|---|
| 1 | INTEGRATED FLOW RATE | NOT GOOD |
| 2 | SPAN OF FLOW RATE | GOOD |

DATA CHECK RESULTS

INCONFORMITY BETWEEN DATA OF SENSOR AND DATA OF SIGNAL PROCESSOR HAS OCCURRED.

| F1 | F2 | F3 | F4 |
|---|---|---|---|
| 7 | 8 | 9 | → |
| 4 | 5 | 6 | ← |
| 1 | 2 | 3 | ↑ |
| 0 | . | ↵ | ↓ |
| EXIT | | SET | SEND |

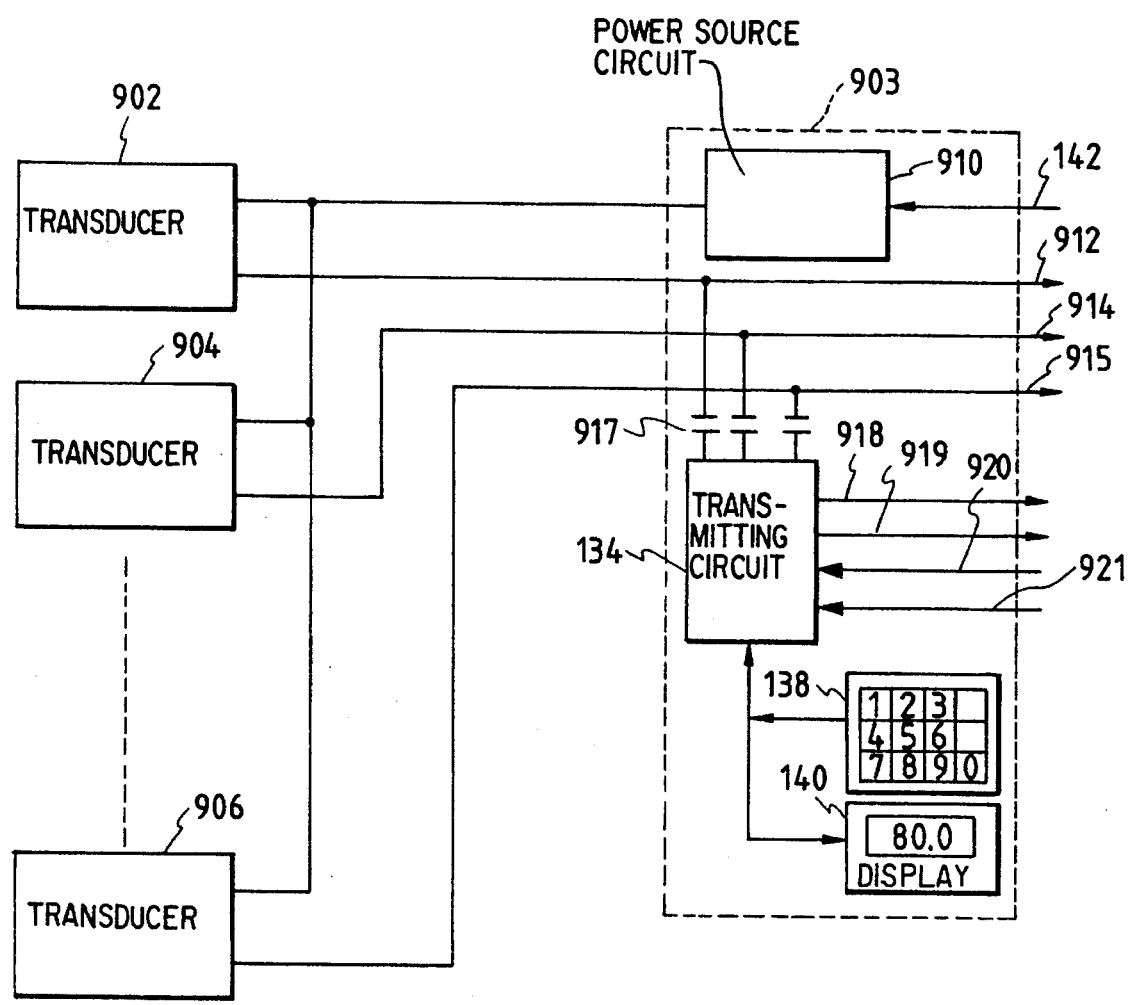

ELECTROMAGNETIC FLOW METER

BACKGROUND OF THE INVENTION

1. Field of the Invention

The present invention relates to the construction of and signal transmission means for an electromagnetic flow meter for industry.

2. Description of the Related Art

A conventional electromagnetic flow meter is fundamentally based on the remote type construction as shown in FIG. 14. That is, a sensor has a coil for generating a magnetic field, a core and a pair of electrodes provided in a measurement conduit therein, and a transmitter provided separately outside the sensor supplies an exciting current to the coil and transmits an instantaneous flow rate, an integrated pulse signal and status signals such as a range signal, a flow direction signal, an anomaly indicating signal and so on in the analog and digital signal form by amplifying and transforming an potential detected by the electrodes of the sensor. An integral type electromagnetic flow meter, an electromagnetic flow meter having the constitution wherein a sensor part and a transmitter are assembled together, is known. But the signal transmission method of such an integral type electromagnetic flow meter is the same method as that of the above-mentioned remote type one. The conventional electromagnetic flow meter has the followings disadvantages.

As for the conventional remote type electromagnetic flow meter:

(a) This type flow meter has a high installation cost because it necessary to provide such elements as highly specified expensive cables and a metal conduit pipe to contain the cables to prevent the signal line from being apt to suffer noises induced by the exciting line or other power apparatus due to tens, uV of the low signal level and the high impedance at the minimum span.

(b) Since a flow meter is usually installed in a high humidity environment, degradation of electric insulation occurs at terminal portions of signal cables with high input impedance, which often brings about measurement errors or measurement impossibility because of the resultant noise generation.

(c) The length of a cable has restriction in order to keep good S/N ratio and the allowable length is about 300 m. A longer cable than that length makes the measurement impossible.

(d) Cost increase or reliability decrease is occasionally brought about by the complicated constitution of a flow meter due where it is necessary to use such a technique as the shield drive method to solve effects caused by span decrease due to an capacitance of a cable in case of measuring low conductivity fluid.

As for the conventional integral type electromagnetic flow meter:

(a) In the case where such signals as a pulse signal, a range signal, an alarm signal, an anomaly indicating signal and so on are separately to be outputted from the flow meter in addition to the flow rate signal, composing the flow meter of the integral structure is very difficult since the part containing electronic circuits becomes large due to an increase in size of a terminal portion and a line inlet or outlet portion for connections to outer circuits. A conventional integral structure of the flow meter is usually realized by composing the electronic circuits at the sacrifice of a part or the whole of the above-mentioned transmitting functions.

(b) In case many output signals and a long distance transmission between the flow meter and a signal receiving instrument are required, a high cost for cabling and construction become problems.

(c) In order to compose the transmitter having such multiple and high quality functions for transmitting signals as mentioned in (a), the number of necessary parts becomes large, which decreases the reliability of the whole flow rate measurement system.

SUMMARY OF THE INVENTION

The present invention has been achieved in consideration of such problems described above as the noise intermixing in a feeble signal transmission in a high impedance transmitting circuit or the restrictions to a transmitting distance and fluid conductivity, and aims at providing a highly noise-proof, reliable, and compact electromagnetic flow meter in which a direct current signal is transmitted and the use of cables on the market are possible.

Features of the present invention are as follows.

(a) In a transducer, those minimum elements necessary for the transducer to function as an electromagnetic flow meter are built-in, and in a signal processor provided separately from the transducer, subsidiary functions for supporting the functions of the above-mentioned autonomous transducer are provided. A digital transmitting means is applied to transmit multiple kinds of information between the transducer and the signal processor.

(b) The differences of reliability levels in the transmission means are established so that the most reliable analog current signal transmitting means is provided for the flow rate signal as the main signal and less reliable transmitting means are provided for other subsidiary signals.

(c) To decrease a transmitting cable cost, multiple kinds of information are sent by a cable in which digital signals of other information are superimposed to the analog signal.

(d) To increase the reliability of the transmission of the analog signal, the analog current signal such as the flow rate signal is passed through the signal processor in the receiving side without receiving any signal processing. The superimposed digital signals are taken into the signal processor by an alternating current coupling means in the signal processor and processed for operation and control. Thereby, the normality of the flow rate signal as the main signal is kept even if any trouble occurs in the signal processor. This maintains the high reliability of the flow rate signal.

(e) A transmitting part is also incorporated to the transducer by the alternating current coupling, and then the normality of the analog signal transmission is kept even if any trouble occurs in the digital signal transmitting part, which again maintains the high reliability of the flow rate signal.

(f) A power source of a transducer is fed by a direct current power source through the signal processor. Thus, the wiring and installation cost can be lowered since the power line, unlike the case of using the commercial electric power, can be bundled in a multi-conductor cable because there is no potential of cross talk which induces noises from the power line to the signal lines.

(g) A plurality of transducers can be operated by one signal processor since each of transducers can autonomously function as an electromagnetic flow meter. Since the analog current signal of each transducer is passed through the signal processor, it does not receive any effect by the signal processor. And the subsidiary information can be taken into the signal processor by the time sharing method since the subsidiary information is sent by the digital transmitting means through the alternating current coupling.

(h) The calculation processing can be easily executed with respect to the digital signals even if one signal processor gathers the signals from plural transducers. For example, the summations or the differences among the flow rate signals from plural transducers are easily obtained.

(i) Data relating to the flow rate of the fluid to be measured and data for controlling the transducer and the signal processor are transmitted as digital signals between the transducer and the signal processor, and conformity between the data stored in said memory of the transducer and the data stored in a memory of the signal processor is examined to diagnose the data transmission between the transducer and the signal processor.

(j) The base band method or the frequency shift keying (FSK) method which give the best actual results are applied as the digital transmitting method of the subsidiary information.

BRIEF DESCRIPTION OF THE DRAWINGS

FIG. 8 is a display example of the data checking results.

FIG. 12 (b) is a picture explaining the signal waves in the FSK modulating digital transmission.

FIG. 13 shows another embodiment of the present invention.

DETAILED DESCRIPTION

Hereinafter, details of the present invention are explained based on embodiments referring to drawings.

Figure 1:
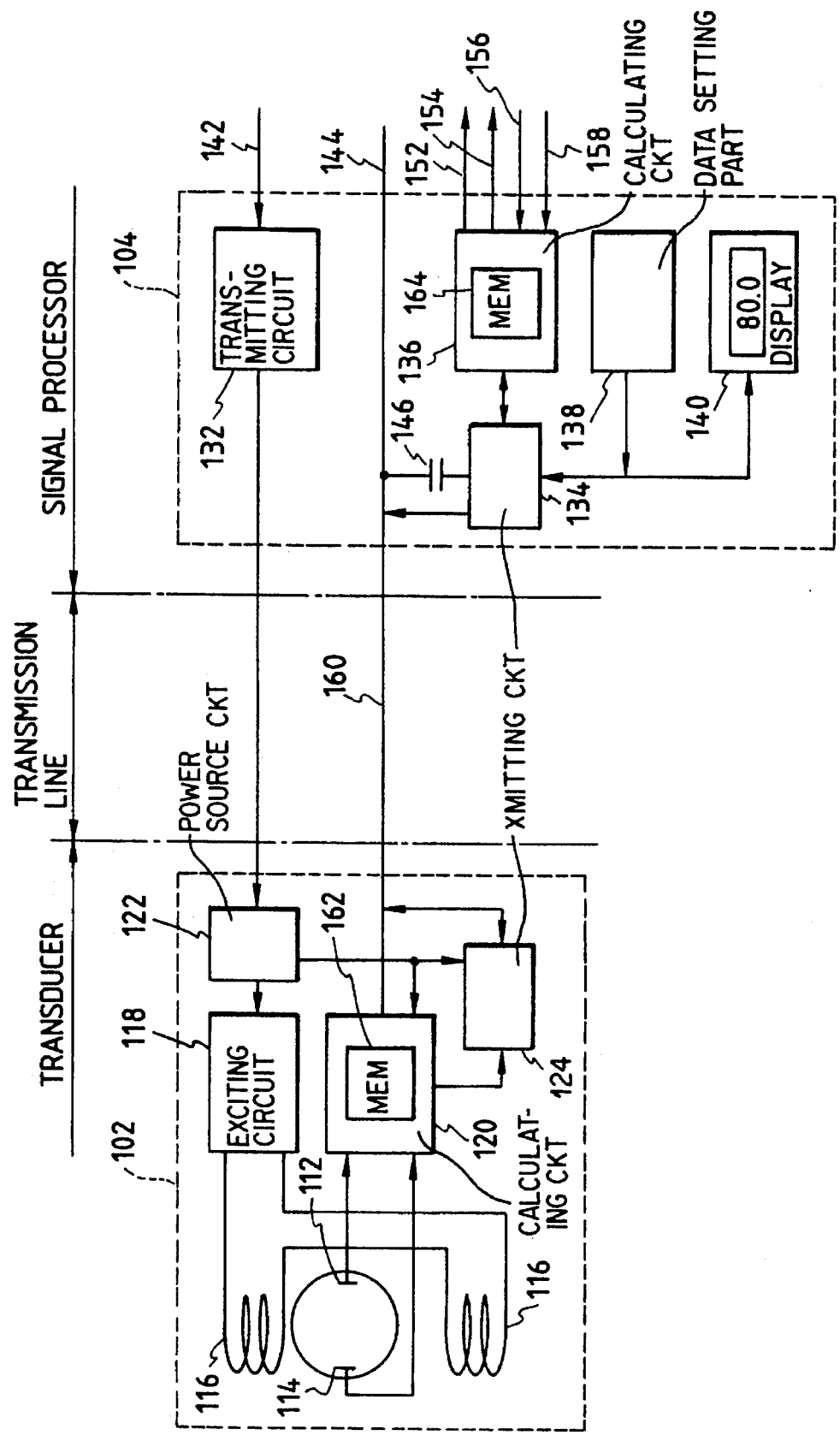
FIG. 1 shows the constitution of an electromagnetic flow meter of an embodiment by the present invention.

FIG. 1 shows the constitution of an electromagnetic flow meter of an embodiment of the present invention. The electric power is fed to a transducer 102 through a power source circuit 122 from an power source 142 fed to a signal processor 104. The electric power is taken into a power source circuit 122 through a cable in a transmission line which supplies the electric power to each part of the transducer 102. An exciting circuit 118 generates rectangular form currents flowing in the forward and reverse direction which excite an exciting coil 116. Then, the detected rectangular form potentials are generated in the forward and reverse direction in accordance with Faraday's law and the similar rectangular form of a detected potential is induced between electrodes 112 and 114. A flow rate and other information are obtained by amplifying and calculating the detected potential by use of an amplifying and calculating circuit 120. The flow rate is outputted as a flow rate signal 144 in the form of an analog constant current signal, for example, of 4–20 mA corresponding to flow rate magnitude and other information are modulated to digital signals which are further superimposed to the analog signal 144 and transmitted through a transmitting circuit 124. The analog signal 144 is outputted through the signal processor 104 without receiving any signal processing. On the other hand, the digital signals are received by a transmitting circuit 134 through an alternating current coupling means 146 and inputted into a calculating circuit 136. The calculating circuit 136 discriminates and processes the digital signals, and inputs or outputs those signals as input or output signal 152–158. The data in a memory 162 of the amplifying and calculating circuit 120 of the transducer 102 are transmitted in the digital signal form also through the transmitting circuit 124 and written into a memory 164 of the calculating circuit 136 in the signal processor 104. And the data set to a data setting part 138 are written into the memory 162 of the amplifying and calculating circuit 120 through the transmitting circuit 134, a transmission line 160 and the transmitting circuit 124, and displayed on a display part 140. Then, parameters or data necessary for flow measurement which are stored in the memory 162 of the transducer 102 can be renewed by the data setting part 138 of the signal processor 104.

Figure 2:
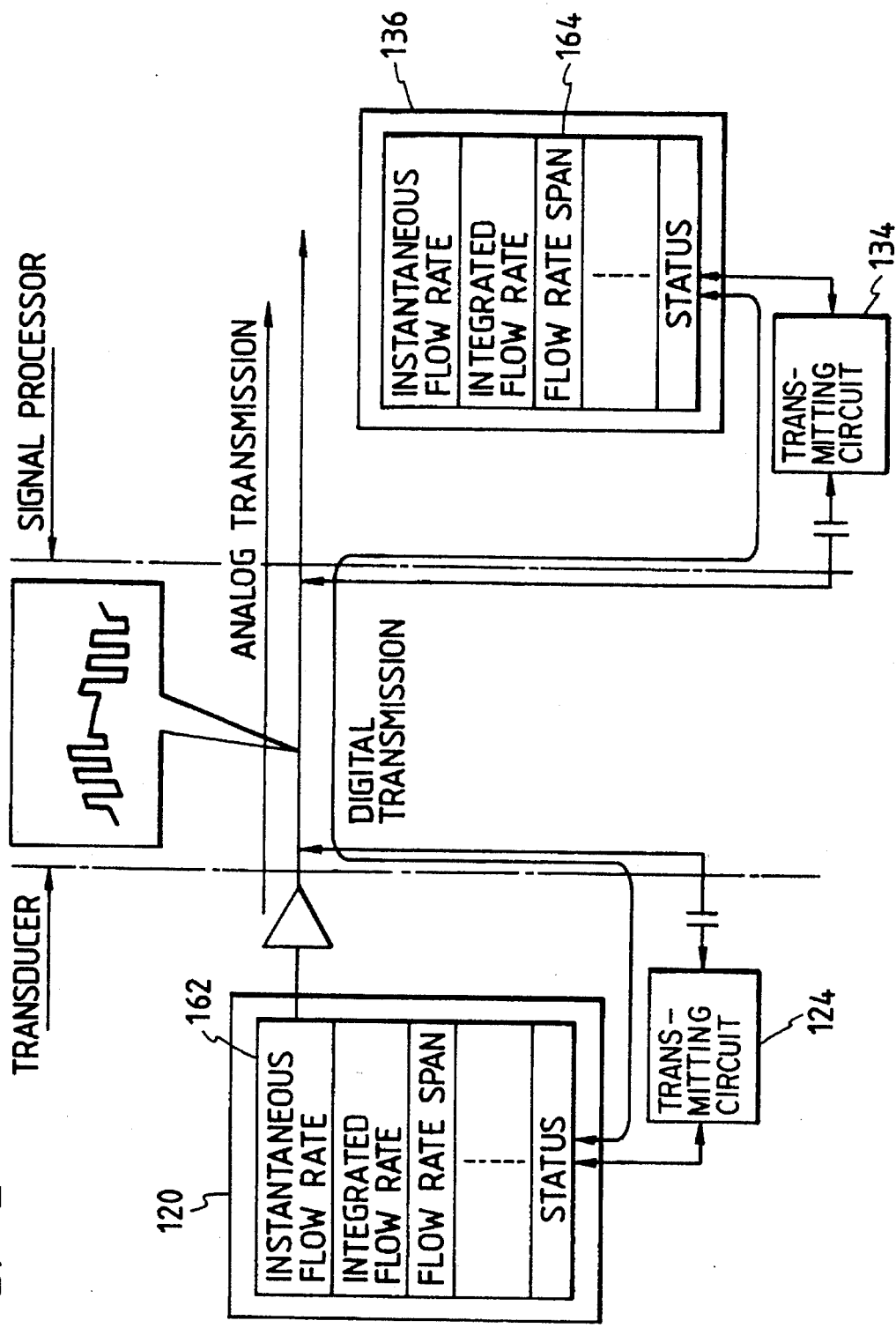
FIG. 2 is a drawing for explaining the data transmission in the embodiment of FIG. 1.

The above-mentioned signal and process flows are minutely shown in FIG. 2. An instantaneous flow rate of the data in the memory 162 is transformed from digital to analog data (D/A) and transmitted as an analog signal, for example, of 4–20 mA constant current to the signal processor 104. On the other hand, other data such as an integrated flow rate indicating the summation of the flow rate during the predetermined period, a span data of flow rate indicating the range width by which the transducer presently measures the flow rate, what is called status information indicating the forward or reverse flow direction, the automatic changing mode of the flow rate span data of the transducer 102, the abnormal operation states of the transducer 102 and so on, and various kinds of data stored in the memory 162, are all transmitted as digital signals to the memory 164 controlled by the calculating circuit 136 through the transmitting circuit 124, the transmission line 160 and the transmitting circuit 134. The signal transmitted in the transmission line 160 is sent, for example, by superimposing the digital signals to the analog current signal of 4–20 mA. Those signals in the transmission line are bidirectionally transmitted between the transducer 102 to the signal processor 104 and vice versa through the transmitting circuits 124 and 134. The data in the memory 162 of the transducer 102 can be bidirectionally sent to the memory 164 of the signal processor 104 and, conversely, data transmission from the signal processor 104 to the transducer 102 is also possible, which makes it possible to send data such as the parameter of the measurement conditions from the signal processor 104 to the transducer 102. Furthermore, it is possible to detect data in the transmission line 160 and transmit data to transmission line 160 by attaching a hand held terminal to the transmission line 160.

In this case, by treating the data in the memory 316 as master data and the data in the memory 504 as slave data in controlling the memory 316 of the transducer 102 and the memory 504 of the signal processor 104, it is possible to process slave data in the memory 504 as temporary data until the slave data is transmitted to the memory 316. Then, if any disagreement is found between the data in the memory 316 and the memory 504, the transducer 102 and the signal processor 104 have the same flow state data and use the data for calculation process by transferring the master data in the memory 316 to the memory 504. Further, the transducer 102 and the signal processor 104 can also have the same flow state data by setting the master and the slave data inversely to the above-mentioned setting way.

Figure 3:
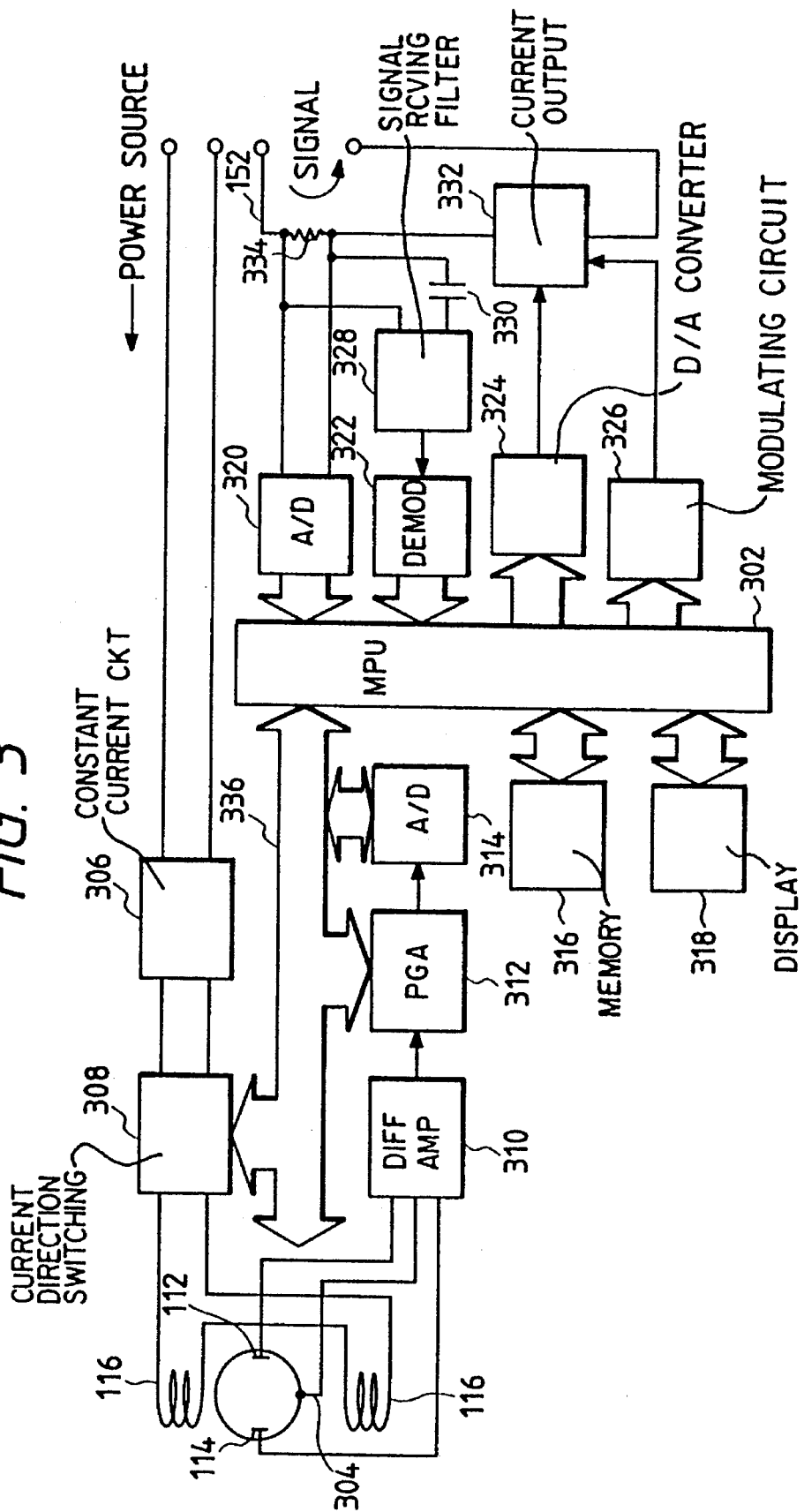
FIG. 3 shows the constitution of transducer circuits.

By FIG. 3, the circuit constitution of the transducer 102 is explained in detail.

A microprocessor (MPU) 302 is provided in the signal processor 104 and the MPU controls circuits in the signal processor 104 and processes information in accordance with control programs and parameters for controlling stored in a memory 316.

After the direct current power fed from the signal processor 104 is adjusted into a constant current by a constant current circuit 306, the polarity of the current is changed by a current direction switching circuit 308 and the current is applied to the exciting coil 116 in a rectangular form with forward and reverse directions which generates the alternating magnetic field in the forward and reverse direction rectangular form in the measurement conduit. The potential detected by the electrodes 112 and 114 is inputted in a differential amplifier 310 and amplified with the ground potential 304 of the conduit. And it is amplified to the optimal level by a programmable gain amplifier (PGA) 312. Further, it is changed into a digital signal by an A/D converting circuit 314 and taken into MPU 302 which calculates flow rate data in accordance with programs and parameters set in the memory 316. The calculation results of the flow rate data is displayed on a display device 318, changed into an analog output signal, for example, of 4–20 mA constant current according to the measured instantaneous flow rate which is outputted to the signal processor 104 and a control system through a D/A converter 324 and a current outputting circuit 332, and the data of the instantaneous flow rate is stored in the memory 316. Then, MPU 302 obtains the integrated flow rate value by integrating the instantaneous flow rate value during the predetermined time interval and stores it in the memory 316.

The digital data such as integrated flow rate, the span of flow rate, the status data of the transducer 102, etc. shown in FIG. 2 to be superimposed to the analog signal are outputted by the current outputting circuit 332 modulated by a modulating circuit 326 controlled by MPU 302. As the superimposing method of digital signals to an analog signal, the base band signal transmission method or the FSK signal transmission method can be utilized in modulating data.

On the other hand, in processing the digital signals from the signal processor 104 to the transducer 102, the voltage changes at the both terminals of a reference resistance 334 are taken by a capacitance coupling means of a condenser 330 and into MPU 302 through a signal receiving filter 328 and a demodulating circuit 322 after noise removal by the signal receiving filter 328, and processed by MPU 302 in accordance with programs and parameters stored in the memory 316. If contents of the taken digital signals are, for examples, the span change of flow rate, the change of exciting timing to the measurement conduit, the time interval change of flow rate integration, the requirement for changing the status data of the transducer 102 such as the right or wrong judgment of automatic span changing states of flow rate, the corresponding data in the memory 316 are renewed.

MPU 302 can take in and process the analog constant current value in the transmission line 160 detected as the voltage at the both terminals of the reference resistance 334 through an A/D converting circuit 320 and controls the switching timing of the current direction switching circuit 308, the amplification degree of PGA 312 and the converting conditions of an A/D converting circuit 314.

And, MPU 302 has the control function of displaying the 13 instantaneous flow rate value, the contents of information transmitted in digital signals, the contents of data in the memory 316 and the constant current value as an analog signal.

Furthermore, although the instantaneous flow rate value is transmitted as a constant current, it is possible to send the instantaneous flow rate by superimposing it as a digital signal to the constant current under the predetermined conditions in accordance with a program stored in the memory of the MPU in the transducer. And, the integrated flow rate can be also outputted not as a digital signal but as the constant current of 4–20 mA by predetermining the transmission protocols between the transducer and the signal processor.

Figure 4:
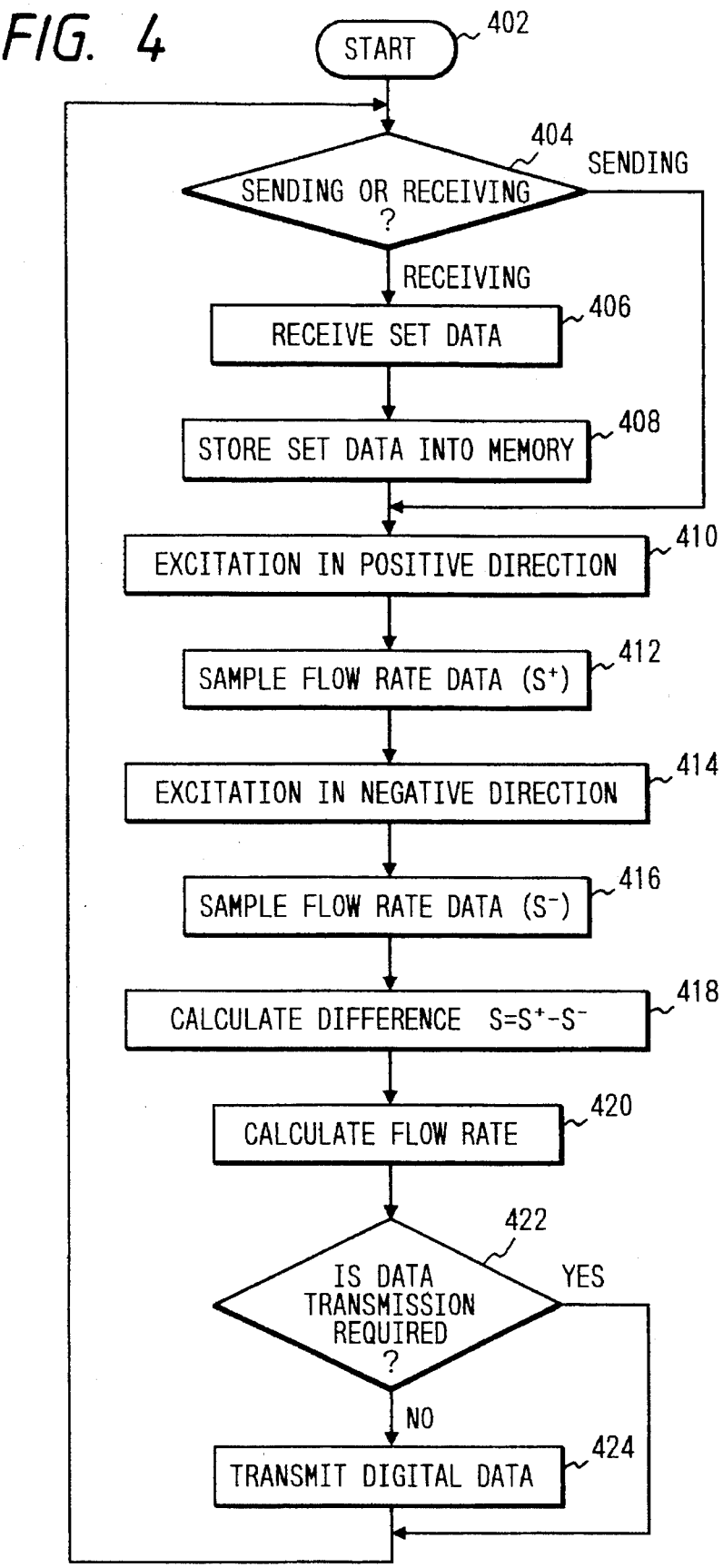
FIG. 4 is a flow chart indicating the operations of the transducer.

The operation of the transducer 102 is explained by FIG. 4.

In the step 402, the transducer 102 starts the operation.

In the step 404, MPU 302 of the transducer 102 judges whether the transducer 102 is in the states for receiving signals from the receiving unit such as a signal processor connected to the transmission line 160.

In the step 406, MPU 302 sets the transducer 102 to the states for receiving signals and takes in digital signals in the transmission line 160 through the A/D converting circuit if the state of the transducer is judged to be in the state ready for receiving the signal transmitted from the signal processor 104 to the transducer 102, for examples, signals for requiring the span change of flow rate, the timing change of excitation switching to the measurement conduit and the time interval change of flow rate integration, the status 14 information of changing the measurement states of the transducer 102 such as a signal for requiring change of the automatic span changing state.

In the step 408, MPU 302 stores in the memory 316 the status information for changing the measurement states of the transducer 102 from outer components and the stored data in the memory are used for the measurement thereafter.

In the step 410, the transducer 102 applies the forward direction rectangular magnetic field to the measurement conduit.

In the step 412, the transducer 102 senses the potential detected by the electrodes, calculates the flow rate data (S+) and stores it in the memory, in the forward direction excitation stage.

In the step 414, the transducer 102 applies the reverse direction rectangular magnetic field to the measurement conduit.

In the step 416, the transducer 102 senses the potential detected by the electrodes, calculates the flow rate data (S–? and stores it in the memory, in the reverse direction excitation stage.

In the step 418, MPU 302 obtains the result value of difference calculation S (S=(S+)–(S–)) and stores it in the memory by using the flow rate data S+ and S–.

In the step 420, the instantaneous flow rate value and the integrated flow rate value obtained by integrating the instantaneous flow rate value during the predetermined time interval are calculated by using the result value S of difference calculation and stored in the memory.

In the step 422, MPU 302 judges whether the transducer 102 is in the state to send signals by checking requirements from the outside of the transducer and on the basis of an internal condition judgement.

In the step 424, MPU 302 superimposes the data indicating flow states, such as the integrated flow rate value and the data in the memory indicating the measurement states of the transducer 102, as digital signals to the constant current indicating the instantaneous flow rate value, and transmits them to the receiving unit such as the signal processor.

Figure 5:
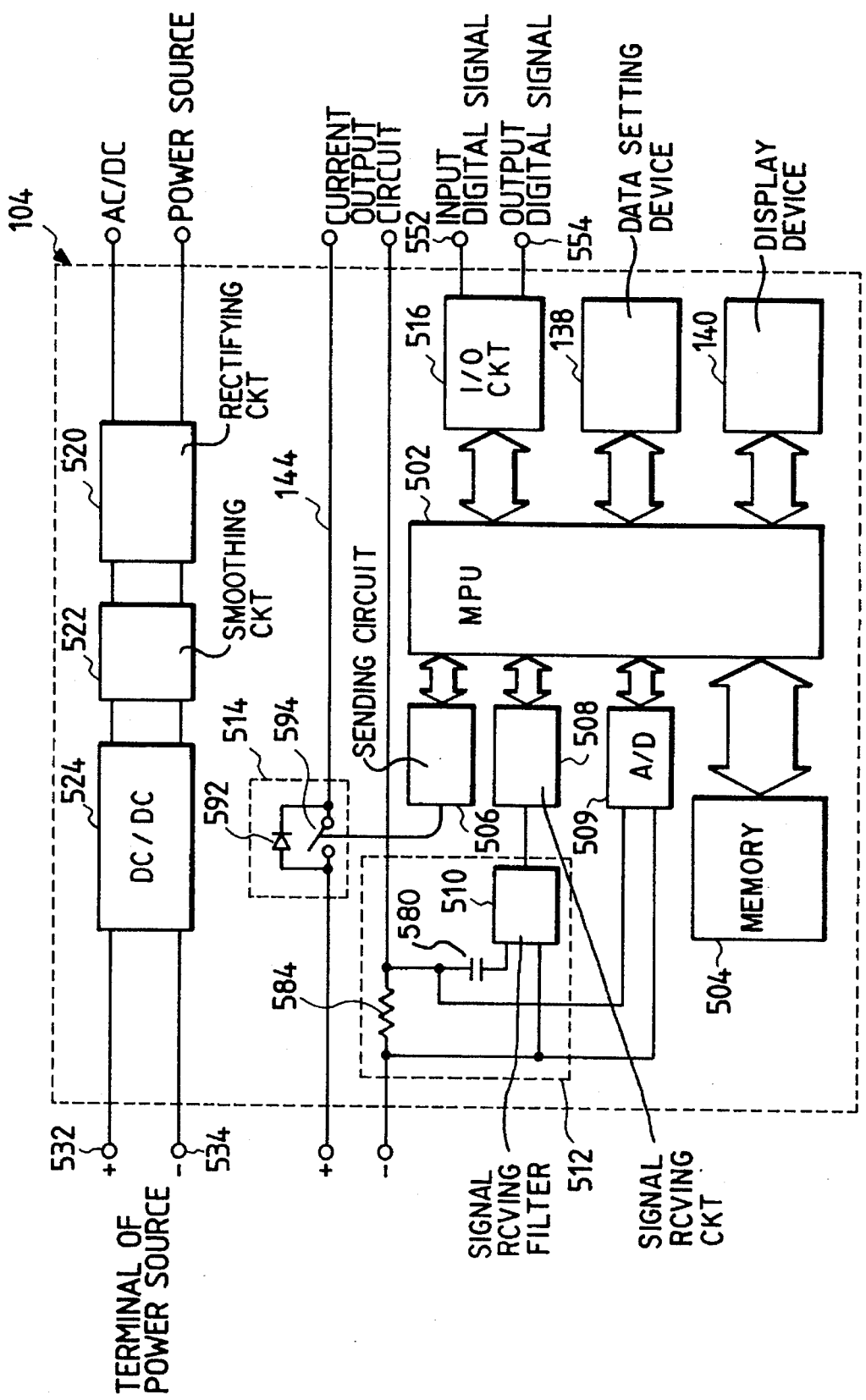
FIG. 5 shows the constitution of signal processor circuits.

The circuit constitution of the transducer 102 is explained in detail with reference to FIG. 5.

AC power from the commercial power source or DC power is fed to a rectifying circuit 520. The output from the rectifying circuit 520 is inputted into a smoothing circuit 522 and further to a DC—DC converting circuit 524 after removing the ripple of the power, transformed to a stable constant voltage power source needed for the transducer 102 and outputted from terminals of power source 532 and 534. The power is also fed to each circuit of the signal processor 104 from the DC—DC converting circuit 524, which is not shown in the figure.

A microprocessor (MPU) 502 is provided in the signal processor 104 and the MPU controls each circuit of the signal processor 104 and processes information, in accordance with control programs and data stored in a memory 504.

In the memory, there are stored the span data of flow rate used in reading the information sent in the transmission line 160, for example, the constant current value of 4–20 mA corresponding to the measured flow rate and converting the read constant current value to the measured flow rate value, the integrated flow rate data used in reading the integrated flow rate value sent in a digital signal in the transmission line 160 and converting it to the integrated flow rate value detected by the transducer 102, the timing data of the excitation switching by the transducer 102 to the measurement conduit sent in a digital signal, the time interval data for the flow rate integration and the status data indicating the states of the automatic range changing of the flow rate span.

The data stored in the memory 504 for reading the signals from the transducer 102 and various data needed to control each the signal processor 104 are inputted through a input/output circuit 516 or an input terminal 552 using an input device such as a keyboard.

MPU 502 can take in the analog constant current value and process it by detecting, for example, the instantaneous flow rate value sent as the constant current value of 4–20 mA corresponding to the flow rate measured by the transducer 102 which is transformed to the voltage at the both terminals of the reference resistance 584 and converted to a digital signal by an A/D converting circuit 509. The instantaneous flow rate value measured by the transducer is calculated in accordance with the span data of flow rate stored in the memory 504 and displayed on a display device 140 as the occasion calls for it.

On the other hand, in processing the digital signals from the signal processor 102 to the transducer 104, the voltage changes at the both terminals of a reference resistance 584 provided in a demodulating circuit 512 are taken by a capacitance coupling means of a condenser 580 and into MPU 502 through a signal receiving filter 510 and a receiving circuit 508 after noise removal by the signal receiving filter 510, and processed by MPU 502 in accordance with programs and parameters stored in the memory 504. And, MPU 502 stores the data sent from the transducer 102, namely, the integrated flow rate value, the span data of flow rate, the timing data of the excitation switching to the measurement conduit, the time interval data of the flow rate integration, the status data indicating the automatic range changing states of the flow rate span, etc. into the memory 504 and displays them on a display device 140 as occasion calls.

Furthermore, MPU 502 stores the instantaneous flow rate value obtained from the analog constant current flowing in the transmission line in the memory 504 by each measurement timing and obtains the integrated flow rate by independently executing the calculation in the signal processor 104 under the same timing condition as that of the integrated flow rate calculation in the transducer 102. Since it can be judged whether the instantaneous flow rate or the integrated flow rate sent by the transducer 102 is correctly transmitted to the signal processor 104 by comparing the data of the analog constant current, the instantaneous flow rate or the integrated flow rate which are obtained by the transducer 102 and stored in the memory 504 in the transmission line and the data of the instantaneous flow rate or the integrated flow rate independently calculated by the signal processor 104, it can be checked that the transmission states of the analog signal as the constant current and the digital signals is correctly executed in the transmission line 160. If any difference is found in the values by the comparing process, either the transducer 102, the transmission line 160 or the signal processor 104 can be judged to become abnormal. For example, it is possible to detect the abnormal state occurrences in the transducer 102 of which operation environment is degraded by exposure of strong magnetic field to the electric circuits in the transducer 102, the abnormal transmission line 160 incapable of transmitting a correct constant current and correct digital signals due to the effect of disturbance noises or the abnormal signal processor 104 affected by the power source anomaly which also induces troubles in the transducer 102.

In the same manner, it is possible to detect the abnormal state occurrences in the transducer 102, the abnormal transmission line 160 and the abnormal signal processor 104 by comparing both the data in the transducer 102 and the signal processor 104 relating to the timing data of the excitation switching to the measurement conduit, the time interval data of the flow rate integration, the status data indicating the automatic range changing states of the flow rate span, etc., besides the integrated flow rate.

By the electromagnetic flow meter of the present invention, the effects by the disturbance of noise can be consequently reduced, which makes it possible to lay a cable containing a power source line and signal lines between the transducer and the signal processor, since the abnormality occurrence in the transmission line 160 due to intermixing of the disturbance noises into the transmission line 160 can be detected and the signal level can be increased by changing the flow rate span value to cope with the occurrence of an abnormality.

A modulating circuit 514 is provided in the transmission line 160 to transmit the data needed to the transducer 102 such as the flow rate span data, the status information, etc. which are stored in the signal processor 104 to be sent to the transducer 102. In the modulating circuit 514, a diode 592 is connected to a switching element 594 in parallel and the base band digital transmission is executed by using the voltage dropping operation of the diode 592 in opening and closing the switching element 594. MPU 502 converts the data to be sent to the transducer 102 to digital signals in accordance with programs and transmission protocols predetermined between the signal processor and the transducer, and sends the data to the transducer 102 through a sending circuit 506.

The data to be sent to the transducer 102 are stored in the memory 504 as digital signals through the input/output circuit 516 and can be also inputted from the data setting device 138.

And, data transmission by the FSK digital transmission method is also possible by using a frequency modulating circuit not shown in the figure as the modulating circuit 514.

Further, MPU 502 has a function of outputting the information relating to the transducer 102 and the signal processor 104 stored in the memory.

Figure 6:
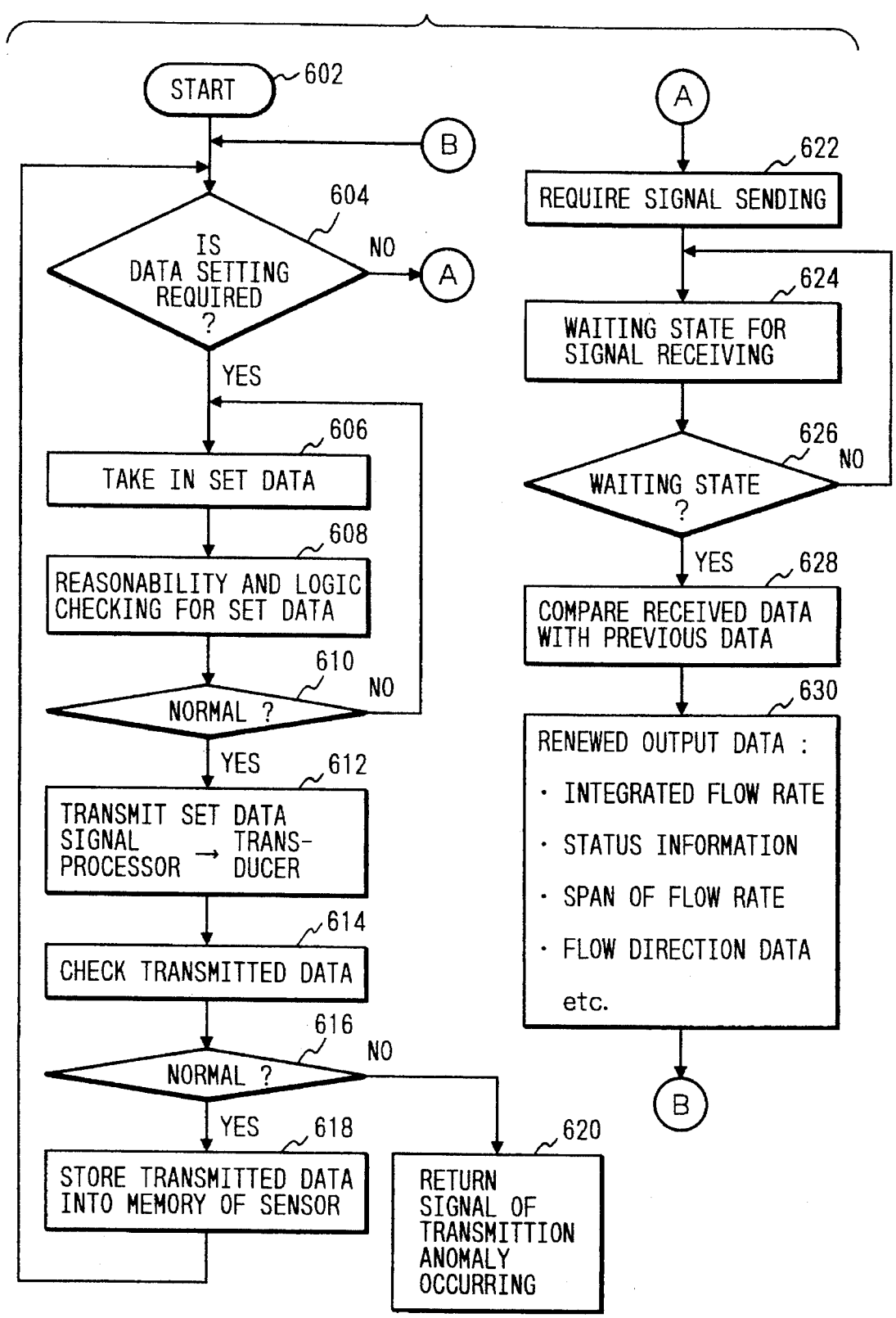
FIG. 6 is a flow chart indicating the operations of the signal processor.

The operations of the signal processor 104 are explained by using the flow chart shown by FIG. 6.

In the step 602, the signal processor 104 starts operations.

In the step 604, MPU 502 of the signal processor . 104 judges whether the signal processor is in the state of data setting.

In the step 606, MPU 502 takes in the set data needed for the measurement of the transducer 102, such as the flow rate span data, the status information, etc., through the input/output circuit 516 or the data setting device 138 of the signal processor 104.

In the step 608, MPU 502 checks the contents of the set data inputted in the step 606 as to logical reasonability in accordance with processes prescribed by a program stored in the memory 504.

In the step 610, if the judgement results of the step 608 indicate anomaly of the set data, the processing goes back to the step 606.

In the step 612, the set data stored in the memory 504 is sent from the signal processor 104 to the transducer 102 through the transmission line 160. The data is sent as a digital transmission way which the digital signals are superimposed to the constant current in the transmission line 160 by operating the modulating circuit 514 controlled by MPU 502 through the sending circuit 506 and applying the base band digital transmission method or the FSK digital transmission method.

In the step 614, MPU 302 of the transducer 102 checks the set data sent from the signal processor 104 as to logical reasonability in accordance with processes prescribed by a program stored in the memory 316. By the checking, it is prevented that the anomalous data due to the abnormal states of the transmitting means or the transmission line 160 are taken into the transducer 102.

In the step 620, if the set data received by the transducer 102 are judged to be anomalous, MPU 302 superimposes a digital signal expressing the signal anomaly to the constant current in the transmission line 160 by operating the modulating circuit 326 and applying the base band digital transmission method or the FSK digital transmission method and sends the digital signal to the signal processor 104.

In the step 618, if the set data received by the transducer 102 are judged to be normal, MPU 302 stores the set data in the memory 316 and executes the flow rate measurement based on the set data thereafter.

The step 622 is carried out in case the signal processor 104 is judged not to be in the state of data setting and, in the step, the transducer 102 is required to send the measured data such as the integrated flow rate data, the status information indicating the measurement or component states of the transducer 102 such as the flow rate span, etc. to the signal processor 104. The digital signal requiring the signal sending is transmitted as a digital transmission in which the digital signals are superimposed to the constant current in the transmission line 160 by using the base band digital transmission method or the FSK digital transmission method.

In the steps 624 and 626, the signal processor 104 stays in the waiting state until a response signal is returned back from the transducer 102.

In the step 628, MPU 502 executes a check for changes of the data sent from the transducer, for example, the measured data such as the integrated flow rate data, the status information indicating the measurement or component states of the transducer 102 such as the flow rate span, etc. by comparing those data with the corresponding data stored in the memory 504 of the signal processor 104 one step previously.

In the step 630, the signal processor 104 displays the information relating to the data which have changed in the data sent from the transducer 102 on the display device 140. The information displayed on the display device 140 are the measured data such as the integrated flow rate value, the flow direction, etc. and the status information indicating the measurement or component states of the transducer 102 such as the flow rate span data after setting of the flow rate span data is automatically changed by the transducer.

In the flow meter of the present invention, it may happen that the transducer 102 or the signal processor 104 becomes anomalous and has not correct information with respect to each other since the transducer and the signal processor are used at long distance through the long transmission line 160. Therefore, it is necessary to judge the state of the transducer 102, the signal processor 104 and the transmission line 160 by checking the conformity of the information sent from transducer 102 to the signal processor 104 and vice versa.

Figure 7:
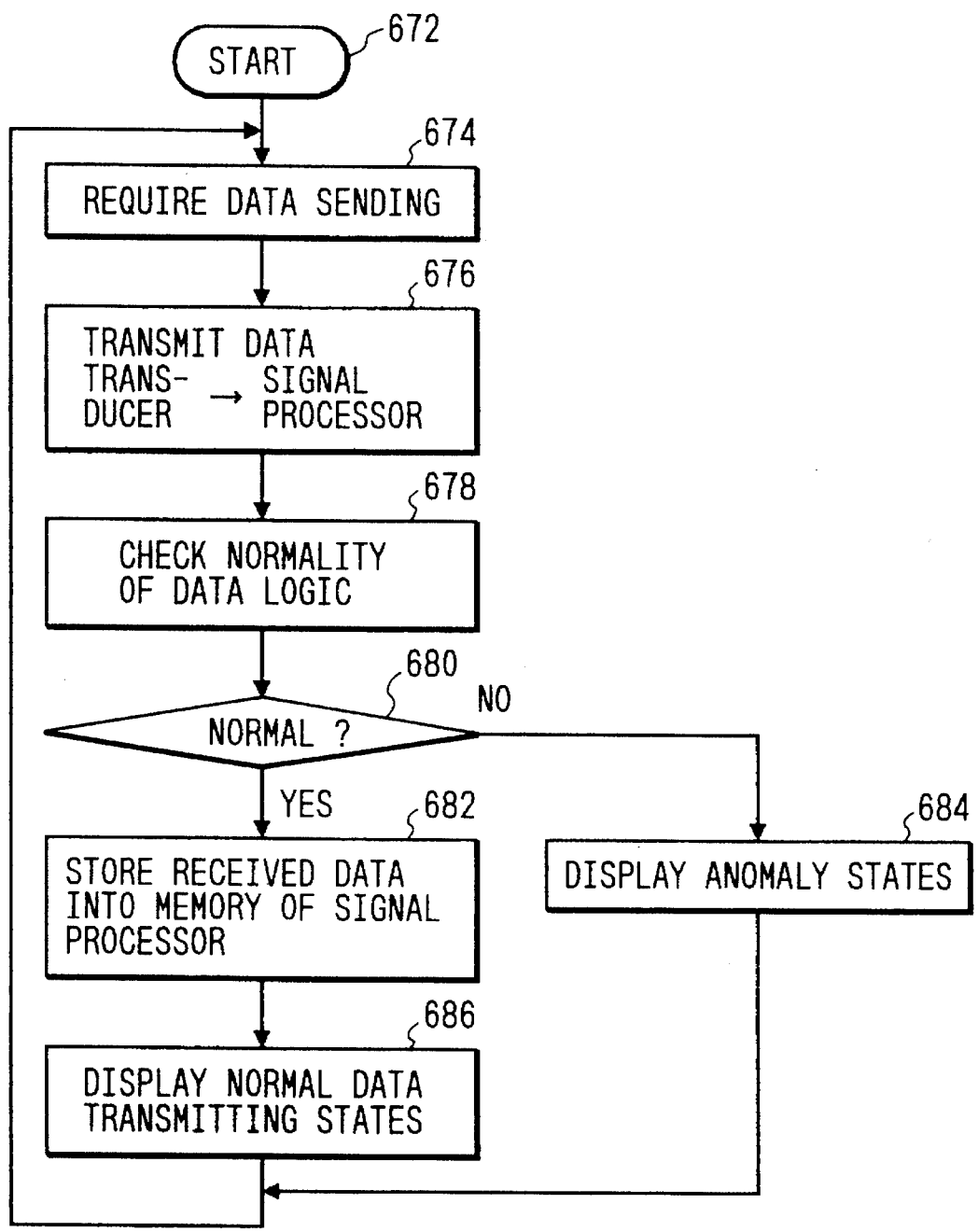
FIG. 7 is a flow chart indicating the checking process of the both data of the transducer and the signal processor.

By using the flow chart shown in FIG. 7, the procedure for confirming the operation states of the transducer 102 and the signal processor 104 by judging the conformity between the information of the transducer and that of the signal processor is explained.

In the step 674, the signal processor 104 requires the transducer 102 to send the measured data such as the integrated flow rate value, the flow direction, etc. and the status information indicating the measurement or component states of the transducer 102 such as the flow rate span data to the signal processor 104 at the predetermined timing or on the predetermined condition in accordance with a program and data stored in the memory 504.

In the step 676, the measured data, the status information, etc. are sent from the transducer 102 to the signal processor 104 through the transmission line 160 by the digital transmission. As the sent information, the integrated flow rate value calculated from the instantaneous flow rate measured by the transducer 102 and stored in the memory 316, etc. as the measured data or the flow rate span used in the transducer 102 at that time, etc. as the status information are sent.

And it is possible to transmit various kinds of the measured data and the status information by changing the program conditions and converting them to one data block.

In the step 678, MPU 502 of the signal processor 104 examines the logical reasonability of the measured data and the status information data, etc. by such a means as the parity checking. Then, MPU 502 of the signal processor 104 judges the conformity between the data sent from the transducer 102 and the corresponding data stored in the memory 504 of the signal processor 104.

In the step 684, by judging the conformity, in case the disagreement between the data sent from the transducer 102 and the data stored in the memory 504 of the signal processor 104 is found, MPU 502 of the signal processor 104 displays the anomaly occurring states on the display device 140 and requires the transducer 102 to send the data again. If the data sent for the second time is normal, the anomaly is treated as a momentary one and the measurement is continued. But, if the data sent for the second time is also abnormal, the anomaly is treated as a genuine and the functions of the signal processor 104 are stopped. In this case, if the anomaly occurs only to the digital signals, the receiving unit such as the signal processor 104 can use the instantaneous flow data as the fundamental flow rate signal since the analog constant current of 4–20 mA is normal.

Then, it is possible to detect anomaly occurrence in the transducer 102 and the signal processor 104 and judge that the instantaneous flow rate sent as the constant current in the transmission line 160 is not correctly sent from the transducer 102 to the signal processor 104 due to the effects of disturbance noises, etc. Further, by the electromagnetic flow meter of the present invention, it is possible to increase the signal level by recognizing that the transmission means has such a problem as intermixing of disturbance noises from the transmission line 160 due to the too low level of the constant current signal in the transmission line 160 and automatically changing the flow rate span, which consequently reduces the effects of the disturbance noises. And, in case the disagreement between the status information data stored in the memory 316 of the transducer 102 and that stored in the memory 504 of the signal processor 104 is found, it is possible to detect anomaly occurrence in the transducer 102 and the signal processor 104 by such an event that the range of the flow rate span is automatically changed at the time of confirmation by the signal processor 104 although the range of the flow rate span was set to the fixed condition. In this case, by the electromagnetic flow meter of the present invention, the retry processing is executed to the status information and the conformity in the data is held between the transducer 102 and the signal processor 104.

In the step 682, If the conformity between the data stored in the memory 316 of the transducer 102 and that stored in the memory 504 of the signal processor 104 is kept, the sent data are stored in the memory 504 of the signal processor 104.

In the step 686, MPU 502 of the signal processor 104 displays that the conformity in the both data is kept, on the display device 140.

In FIG. 8, the results of the conformity checking between the data stored in the transducer 102 and the data stores in the signal processor 104 are displayed on the display device 140.

In the picture of the display device 140 provided in the signal processor 104, the display item 692 shows that the transducer 102 and the signal processor 104 are in the states for the data checking of the information in the respective memories. As an example of the data checking results, the checking results of the integrated flow rate values and the flow rate span data are displayed. The example displayed in the figure shows the nonconformity between the both integrated flow rate values in the transducer 102 and the signal processor 104. And, the warning data contents are displayed on the display device 140 to make an operator recognize that the checking results shows occurrence of an anomaly. Furthermore, the checking items can be changed by renewing the programs in the transducer 102 and the signal processor 104.

By the electromagnetic flow meter of the present invention, it is possible to realize the high level function of an electromagnetic flow meter by later adding the signal processor to a transducer already used without the signal processor.

Figure 9:
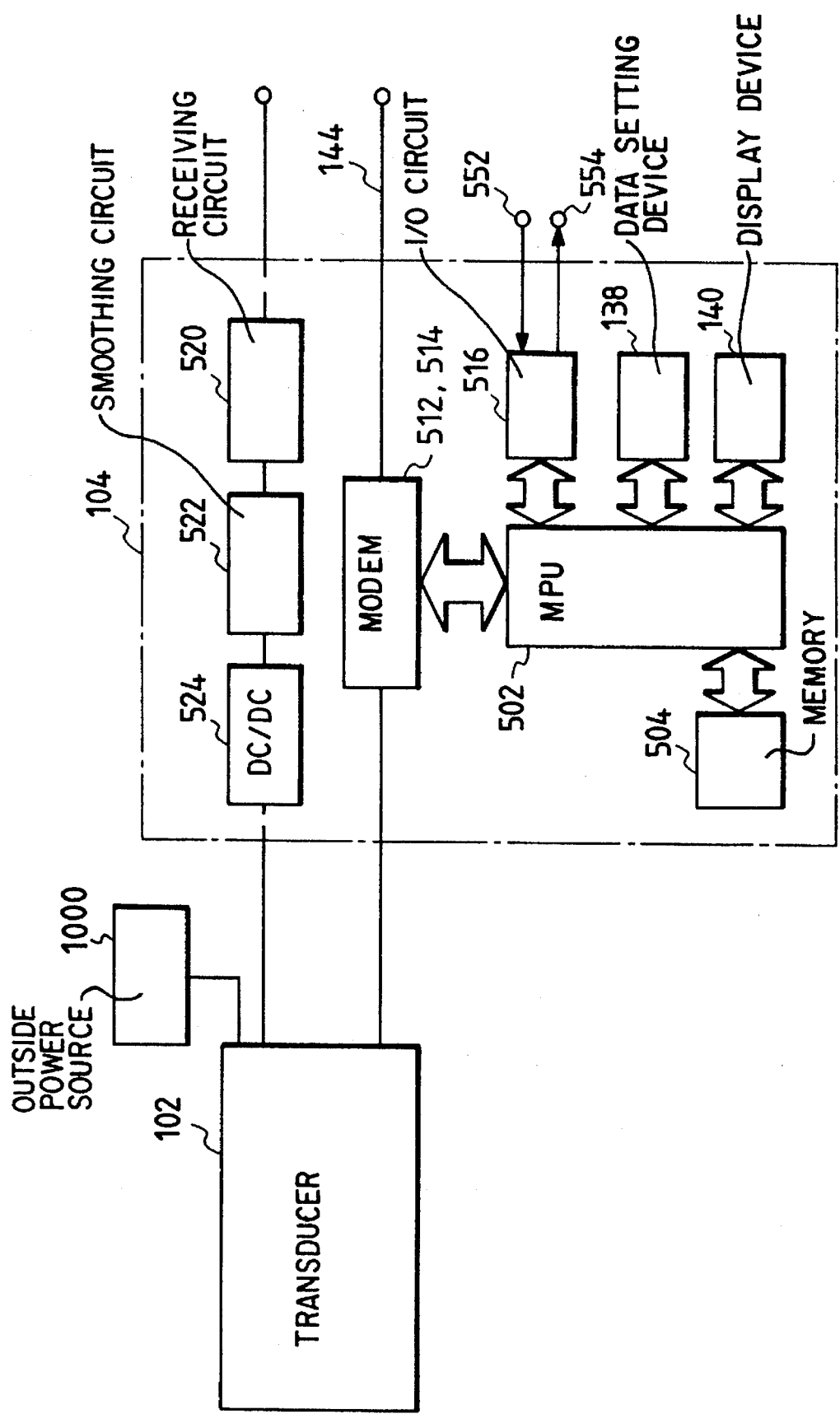
FIG. 9 is a drawing explaining the step up way of the electromagnetic flow meter system.

The above-mentioned realization of the high level function of an electromagnetic flow meter is explained by using FIG. 9.

At the first use stage, the transducer 102 does not have MPU 502 and the modulating and demodulating circuits 512 and 514, and DC 24 V as the electric power is fed to the transducer 102 from an outside power source 1000. And, the needed parameter data are set from a communicator or a signal processor at the shipment time. By the above-mentioned way, the transducer 102 functions as a flow meter for itself and transmits the instantaneous flow rate, etc. of the analog constant current signal to the receiving unit by detecting the flow rate of the object fluid.

And, at the time when the function improvement of the flow meter is needed after the above-mentioned constitution is established, connections to the transducer 102 are changed so that the signal processor 104 are connected, the electric power is fed by the DC—DC converter and the digital transmission through the transmission line 160 becomes possible by the modulating and demodulating circuits 512 and 514 and the input/output circuit 516. By the electromagnetic flow meter of the present invention, it is easy to change the function level of the flow meter from the function of transmitting only analog signals to the improved function of the digital transmission between the transducer 102 and the signal processor 104.

Although it is impossible to transmit digital signals without storing the status information such as the flow rate span in each memory of the transducer and the signal processor, since the information of the object fluid and the data of the component states need to be transmitted by the digital transmission, by the electromagnetic flow meter of the present invention, input operation of the data executed in the transducer 102 is not necessary to the signal processor 104 by providing the function of automatically sending the contents of the memory to the signal processor 104 inputted by use of a data setting device connected to the transducer 102 at the first using stage of the transducer, which does not require an excess burden to an operator and prevents an input error.

Figure 10:
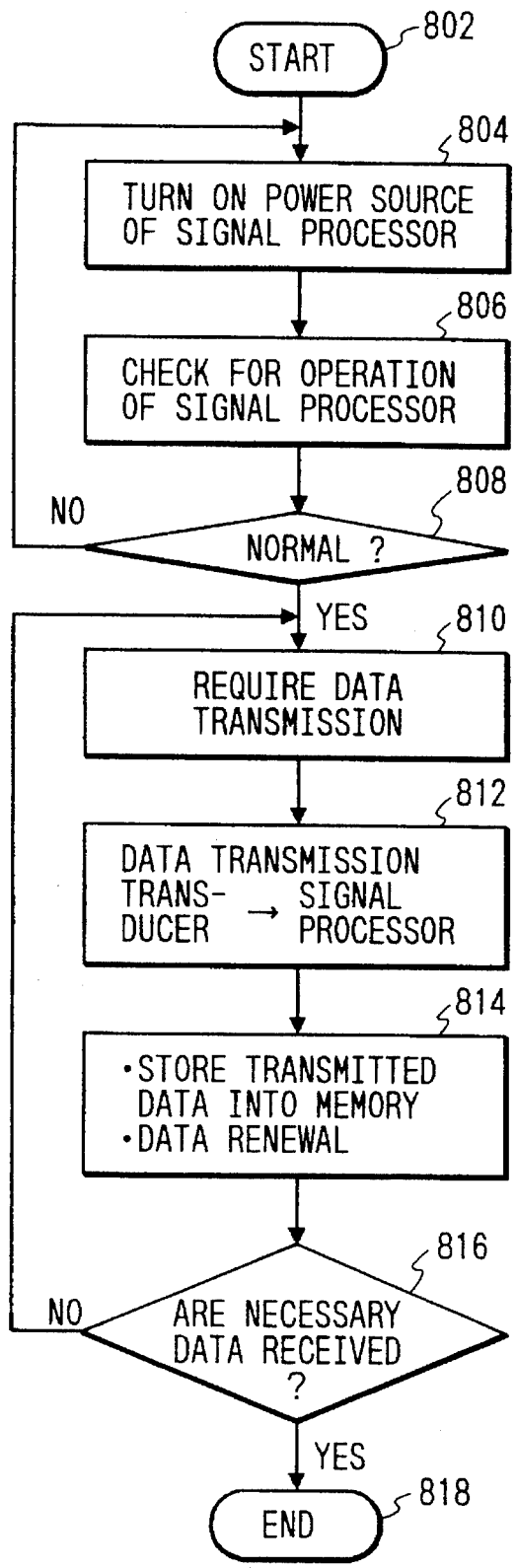
FIG. 10 is a flow chart indicating the checking process of the stepping up of the electromagnetic flow meter system.

By the flow chart shown the FIG. 10, the process for automatically transmitting the contents stored in the memory of the transducer 102 to the memory of the signal processor 104 is explained.

In the step 804, the signal processor 104 including the modulating and demodulating circuits 512 and 514 are provided at the transmission line 160 and the power source is turned.

In the step 806, MPU 502 of the signal processor 104 checks the operations of the signal processor 104 in accordance with a program.

In the step 808, normality of the transducer operations is checked and judged.

In the step 810, the signal processor 104 sends the signal for requiring the digital signals stored in the memory of the transducer 102 such as the status information of the flow rate span, the timing data of the exciting, etc., which are superimposed to the constant current in the transmission line 160, to the signal processor 104. And, in the step, it is possible to send several kinds of status information data by aggregating them into one data block, which makes the data transmission time shorter.

In the step 814, the signal processor 104 stores the received status information data in the memory.

In the step 816, the signal processor 104 judges whether all necessary data are received. If all of the data is not received yet, the signal processor 104 sends the signal for requiring the data transmission, and if all of the data have been sent, a ream of the process is finished.

Figure 11:
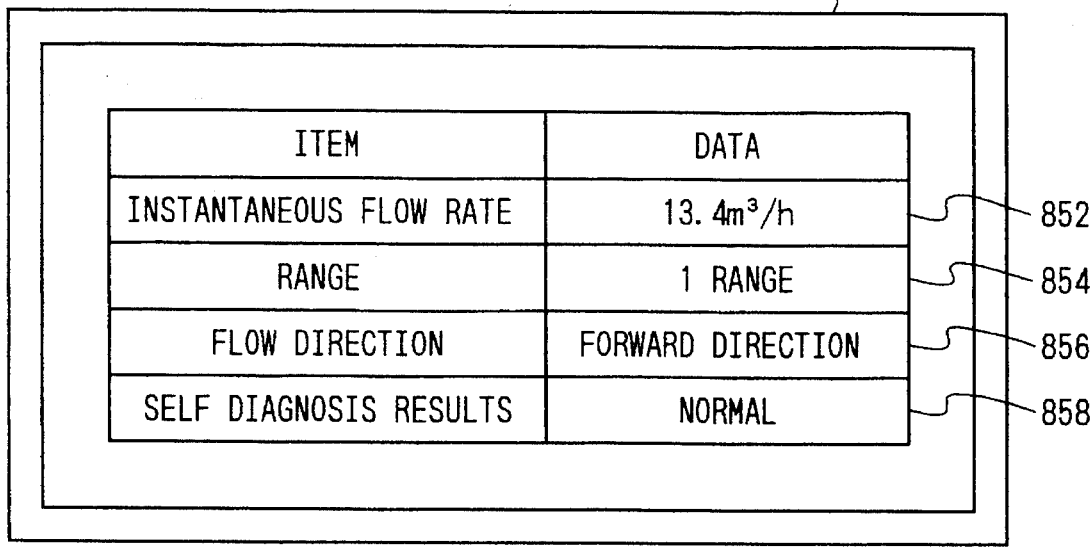
FIG. 11 is an example of a display of the electromagnetic flow meter of the present invention.

In FIG. 11, a display example displayed on the display devices of the transducer and the signal processor is shown.

In the display device shown in the figure, the latest measured instantaneous flow rate value 852 is displayed. Besides the instantaneous flow rate value, the status information of the transducer and the signal processor is shown below.

As the flow rate range (the flow rate span), the present flow range state 854 is displayed. The flow rate range indicates what flow rate range corresponds to the constant current value of 4–20 mA. For example, the 4–20 mA corresponds to 0–10 $m^3/h$ in the first measurement range (the first flow rate span), to 0–500 $m^3/h$ in the second measurement range (the second flow rate span) and to 0–1000 $m^3/h$ in the third measurement range (the third flow rate span). In the example shown in the figure, the signal of 4–20 mA is sent in the first measurement range.

The information on the present flow direction of the object fluid 856 is displayed as the predetermined forward direction or the predetermined reverse direction.

The results of the self diagnosis in the transducer and the signal processor executed by a program in each of the memories is also displayed.

Figure 12A:
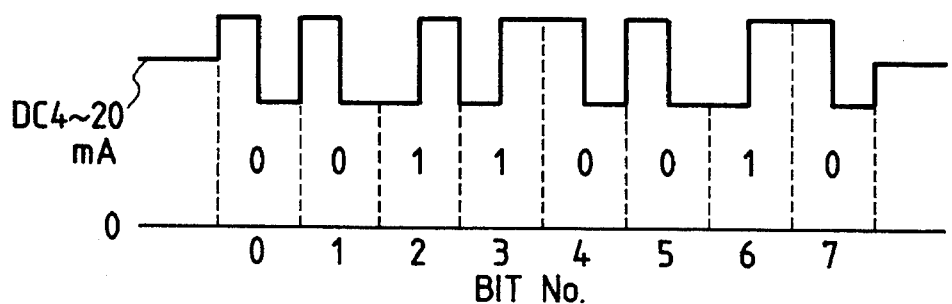
FIG. 12 (a) is a picture explaining the signal waves in the base band digital transmission.
Figure 12B:
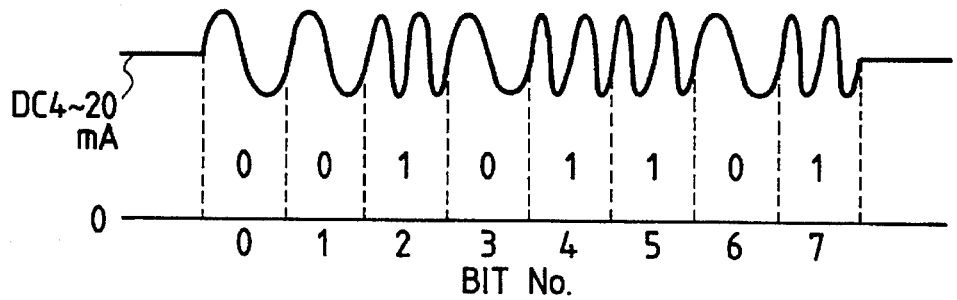
Figure 14:
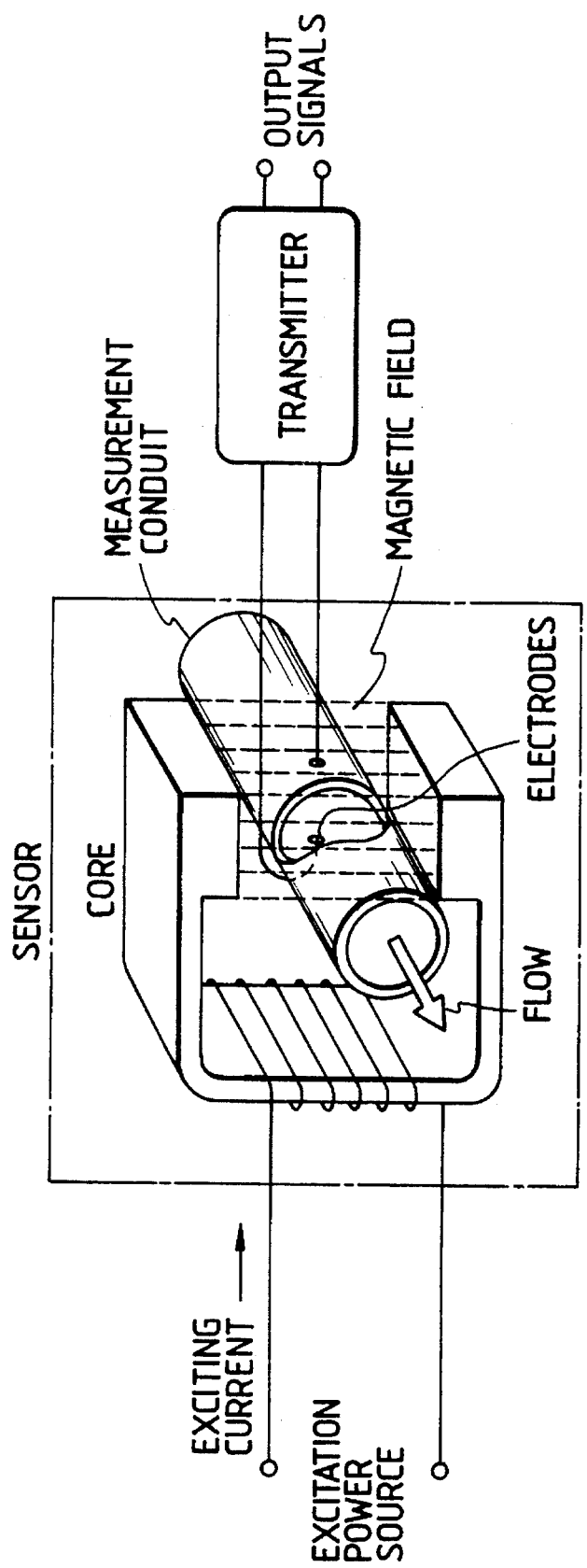
FIG. 14 shows a picture showing a conventional remote type electromagnetic flow meter.

In FIG. 12, it is shown the example in which the digital signals are superimposed to the constant current of 4–20 mA by using the base band method or the FSK modulating method.

In the base band method, the modulating circuits of the transducer and the signal processor rises and drops the constant current of 4–20 mA in the rectangular form and 1 or 0 is assigned in the rising phase or in the dropping phase, respectively. And, in the demodulating step, the rising or dropping of the modulated constant current signal are decoded to digital signals and taken into MPU. Since the digital signal is modulated by a small amplitude (for example, the amplitude of +0.5 mA to the constant current 16 mA) and in a symmetrical height in the forward and reverse direction, the stable constant current is obtained by averaging the transmitted signals including the digital signals with a low pass filter and the constant current signal of 4–20 mA can be correctly detected.

In the FSK modulating method, the modulating circuits of the transducer and the signal processor modulate the constant current of 4–20 mA in sine waves and 0 or 1 is assigned according to the difference of frequency. And, in the demodulating step, the frequency difference of the modulated constant current signal are decoded to digital signals and taken into the MPU. In the FSK modulating method as well as in the base band method, the constant current of 4–20 mA is obtained without problems by smoothing the sine wave signals of which the amplitude is symmetrical in the forward and reverse direction.

Further, the digital signals of several kinds of data and the command signals can be bidirectionally transmitted to each other between the transducer 102 and the signal processor 104 by predetermining the transmission protocols between the transducer 102 and the signal processor 104, collecting 8 bits of each information and converting the 8 bit information into 1 byte data and sending them.

FIG. 13 shows another embodiment, combining a plurality of transducers and a signal processor wherein analog current signals from the first transducer 902 to the n-th transducer 906 are independently transmitted through the transmission line and the respective signal is outputted as the first flow rate signal 912, the second flow rate signal 914 and the n-th flow rate signal 915 from the signal processor 104. The digital signals in the respective transmission line are taken into the calculation part 136 through the alternating current coupling 917, processed and sent as the output signals 918 and 919. Data 920 needed to the calculation and parameters 921 of the transducers are inputted from the data setting part 138 and displayed on the display device 140. Electric power to the transducers is fed either individually or commonly through the power source circuit 910 as shown in FIG. 13. In the above-mentioned constitution, it is possible to drive the n sets of transducers by a signal processor and to execute calculation by using each flow rate value from the plural transducers. Therefore, it is easy to calculate summation of the flow rate values or differences among them.

The present invention can solve the problems which the conventional electromagnetic flow meters has and has the features as described in the following.

As for the features of improvements to the problems of the conventional remote type electromagnetic flow meter:

(a) Since the transducer has a MPU which has the function of changing the output constant current value and automatically sets the level of transmitting signal by the constant current going in the transmission line to enough high level, there is scarcely the probability that the constant current receive disturbance noises. For example, in case low level signals of about 4 mA are continuously sent and receive the effects of disturbance noises, and anomaly occurrences are detected by the transducer and the signal processor, the electromagnetic flow rate of the present invention is capable of diagnosing the anomaly occurrence and sending the higher level of the constant current even in the same flow rate. In the conventional remote type electromagnetic flow meter, it is impossible to contain the line for feeding the exciting power and a signal line in the same cable due to induction noises in each other's lines. On the other hand, the electromagnetic flow rate of the present invention can include the power line and the signal line in one cable. Therefore, CVV or VVS cable on the market scan be used to the electromagnetic flow rate of the present invention.

(b) The flow meter of the present invention is scarcely affected by degradation of insulation and hard to receive by noises due to the low signal impedance at the output terminal part of the transducer. Therefore, measurement errors are small and software measurement is impossible hardly occurs.

(c) The flow meter of the present invention practically has no restriction to the transmitting cable length excepts light voltage decrease by the inner resistance since the signal transmission is done by the constant current transmission. Therefore, direct signal transmission without a relay panel is possible to such long distance transmission as the transmission for flow meters provided in a place between mountains or in an extensive plant site.

(d) It is possible to measure the flow rate of low electric conductivity fluid with high accuracy since the signals from the electrodes are amplified and processed in the transducer and the transmitted signal is not affected by the capacitance of a transmitting cable.

As for the features of improvements to the problems of the conventional integral type electromagnetic flow meter:

(a) In the conventional remote type electromagnetic flowmeter, a respective signal line to each needed signal must be drawn from the terminal part for connection to outer components to send the status information to the receiving unit. On the other hand, by the electromagnetic flow meter of the present invention, even in case of sending the status information to the outside, increasing of size of the terminal part for connection to outer components can be prevented since it becomes possible to transmit digital signals by using the analog signal line.

(b) In the conventional remote type electromagnetic flowmeter, since signal lines and a power line to the signal processor induce disturbance noises in the each of the other's lines, the respective cable must be laid for the power line and each signal line. The electromagnetic flow meter of the present invention makes it possible to aggregate the power line and the signal lines into one cable.

(c) In the electromagnetic flow meter of the present invention, the transducer itself has the autonomous measurement function and the measured analog flow rate signal can be passed through the signal processor without receiving any process. Therefore, even if any trouble occurs in the signal processor, the instantaneous flow rate value as the most fundamental data can be transmitted to the control system since the electromagnetic flow meter of the present invention renders the important analog flow rate signal of the data sent from the transducer having the higher transmitting reliability than the other subsidiary information.

As explained above, in the electromagnetic flow meter of the present invention, it is possible that the high reliability of the flow rate signal and the high level functions of the measured data processing are rationally combined. Furthermore, cost reduction of the electromagnetic flow meter is also realized by reducing the number of cables and using cheap cables on the market.

What is claimed is:

1. An electromagnetic flow meter generating signals proportional to flow rate of fluid having a conduit inside which the fluid flows, a magnetic circuit for generating the magnetic field at right angles to the longitudinal direction of the fluid flow and a pair of electrodes provided at right angles to the flow directions of the fluid flow and to the direction of the magnetic field, said electromagnetic flow meter comprising:

a signal processor provided separately from a transducer; and a signal transmission line connecting said signal processor and the transducer;

said transducer including said conduit, an exciting circuit, said pair of electrodes, a memory, an amplifying and calculating circuit, and a transmitting circuit, said transducer having a transmitter transmitting analog constant current signals proportional to flow rate through said signal transmission line and for executing digital transmission between said transducer and said signal processor.

2. An electromagnetic flow meter according to claim 1, wherein a two-wire channel is used as said signal transmission line.

3. An electromagnetic flow meter according to claim 1, wherein said transducer transmits an instantaneous flow rate value of fluid to be measured as said analog constant current signal, and data on flow rate of fluid to be measured and data for control of said memory, said amplifying and calculation circuit and said transmitting circuit of said signal processor are transmitted as digital signals between said transducer and said signal processor.

4. An electromagnetic flow meter according to claim 1, wherein data on flow rate of fluid to be measured and data for control of said memory, said amplifying and calculation circuit and said transmitting circuit of said signal processor are transmitted as digital signals between said transducer and said signal processor, and conformity between said data stored in said memory of said transducer and said data stored in a memory of said signal processor is examined.

5. An electromagnetic flow meter according to claim 1, wherein data on flow rate of fluid to be measured and data for control of said memory, said amplifying and calculation circuit and said transmitting circuit of said signal processor are transmitted as digital signals when predetermined conditions are satisfied.

6. An electromagnetic flow meter according to claim 1, wherein each of said transducer and said signal processor include a display displaying at least one of data on flow rate of fluid to be measured and data for control of said transducer and said signal processor.

7. An electromagnetic flow meter according to claim 1, wherein said analog constant current signals are passed through said signal processor without direct current connection to circuits in said signal processor and transmitted to circuits in said signal processor by an alternating current coupling.

8. An electromagnetic flow meter according to claim 1, wherein an alternating current coupling means is used for superimposing data of said digital transmission to said analog constant current signal whereby said analog constant current signals are not affected by troubles of said circuits in said signal processor.

9. An electromagnetic flow meter according to claim 1, wherein electric power feeding from said signal processor to said transducer is carried out by a direct current power source and a multi-conductor cable is used as a transmission line between said transducer and said signal processor, said multi-conductor cable including at least both of a power supplying line and an analog flow rate signal line.

10. An electromagnetic flow meter according to claim 9, wherein said multi-conductor cable is a four-conductor cable.

11. An electromagnetic flow meter according claim 1, wherein a plurality of transducers are connected to one signal processor, an analog constant current signal from each of said transducers are passed through said signal processor without a direct current connection to circuits in said signal processor and data by said digital transmission is transmitted to circuits in said signal processor by alternating current coupling means.

12. An electromagnetic flow meter according to claim 11, wherein at least one of an instantaneous value of flow rate and an integrated value of flow rate to be contained in said data transmitted by said digital transmission from said plurality of transducers to said signal processor is processed by said signal processor and results of said data processing are outputted and displayed.

13. An electromagnetic flow meter according to claim 1, wherein one of a base band modulation method and a frequency shift keying (FSK) modulation method is applied to said digital transmission between said transducer and said signal processor.

14. An electromagnetic flow meter having a conduit in which fluid flows, an exciting means for adding a magnetic field to said conduit and a transducer including a pair of electrodes for detecting electromotive force generated in said fluid, and outputting measurement data about said fluid to a signal processor via a signal transmission line connecting said transducer and said signal processor, said electromagnetic flow meter comprising:

a first transmitter converting first measurement data indicating flow states of said fluid into analog constant current signals proportional to measured physical quantity and transmitting via said signal transmission line; and a second transmitter converting second measurement data calculated by using said first flow data into digital signals which are superimposed on said analog constant current signals and are transmitted via said signal transmission line, wherein said signal processor detects said first measurement data and said second measurement data.

15. An electromagnetic flow meter according to claim 14, wherein said first measurement data are instantaneous values of flow rates of said fluid continuously outputted as said analog constant current signals.

16. An electromagnetic flow meter according to claim 14, wherein said second measurement data are integrated values of flow rates of said fluid transmitted to said signal processor.

17. An electromagnetic flow meter according to claim 14, wherein a two-wire channel is used as said signal transmission line.

18. An electromagnetic flow meter according to claim 14, wherein said second transmitter superimposes said digital signals on said analog constant current signals in accordance with base band modulation method.

19. An electromagnetic flow meter according to claim 14, wherein said second transmitter superimposes said digital signals on said analog constant current signals in accordance with a frequency modulation methods.

20. An electromagnetic flow meter according to claim 14, wherein said signal processor feeds electric power for driving said exciting means into said transducer via a power source line.

21. An electromagnetic flow meter having a conduit in which fluid flows, an exciting means for adding a magnetic field to said conduit and a transducer including a pair of electrodes for detecting electromotive force generated in said fluid, and outputting measurement data about said fluid to a signal processor via a signal transmission line connecting said transducer and said signal processor, said electromagnetic flow meter comprising:

a transducer memory, provided in said transducer, storing said measurement data about said fluid; and a signal processor memory, provided in said signal processor and storing said measurement data about said fluid transmitted via said signal transmission line, wherein said measured data stored in said transducer memory are compared with said data stored in said signal processor memory.

22. An electromagnetic flow meter according to claim 21, wherein a two-wire channel is used as said signal transmission line, and said measurement data about said fluid detected by said transducer are transmitted by said transducer via said two-wire channel as analog constant current signals proportional to measured physical quantity on which said transducer superimposes said measurement data about said fluid stored in said transducer memory in the form of digital signals.

23. An electromagnetic flow meter according to claim 21, wherein said comparing process of said measurement data in said transducer and said measurement data in said signal processor is executed in at least one of a predetermined interval and establishment of a predetermined condition.

24. An electromagnetic flow meter according to claim 21, wherein said transducer transmits instantaneous values of flow rates of said fluid as said measurement data to said signal processor via said signal transmission line, and stores data of integrated values of flow rates calculated by using said measurement data of said instantaneous values of flow rates in said transducer memory, and said signal processor calculates data of integrated values of flow rates by using said transmitted measurement data of said instantaneous values of flow rates and stores said data of integrated values of flow rates in said signal processor memory, said data of integrated values of flow rates stored in said transducer memory being compared with said data of integrated values of flow rates stored in said signal processor.

25. An electromagnetic flow meter according to claim 21, wherein said transducer transmits span data of flow rates used for calculating flow rates of said fluid as said measurement data to said signal processor via said signal transmission line, and stores said span data of flow rates in said transducer memory, and said signal processor stores said transmitted span data of flow rates in said signal processor memory, said span data of flow rates stored in said transducer memory being compared with said span data of flow rates stored in said signal processor.

26. An electromagnetic flow meter according to claim 21, wherein said transducer transmits timing data of adding magnetic field to said fluid by said exciting means as said measurement data to said signal processor via said signal transmission line, and stores said timing data of adding magnetic field in said transducer memory, and said signal processor stores said transmitted timing data of adding magnetic field in said signal processor memory, said timing data of adding magnetic field stored in said transducer memory being compared with said timing data of adding magnetic field stored in said signal processor.

27. An electromagnetic flow meter according to claim 21, wherein said transducer transmits measurement interval data used for obtaining integrated values of flow rates of said fluid as said measurement data to said signal processor via said signal transmission line, and stores said measurement interval data in said transducer memory, and said signal processor stores said measurement interval data in said signal processor memory, said measurement interval data stored in said transducer memory being compared with said measurement interval data stored in said signal processor.

28. An electromagnetic flow meter according to claim 21, wherein said transducer transmits automatic span switching data of flow rates used to determine flow states and calculating flow rates of said fluid as said measurement data to said signal processor via said signal transmission line, and stores said automatic span switching data of flow rates in said transducer memory, and said signal processor stores said transmitted automatic span switching data of flow rates in said signal processor memory, said automatic span switching data of flow rates stored in said transducer memory being compared with said automatic span switching data of flow rates stored in said signal processor.

* * * * *

UNITED STATES PATENT AND TRADEMARK OFFICE
CERTIFICATE OF CORRECTION

PATENT NO. : 5,469,746

DATED : November 28, 1995

INVENTOR(S) : Masao FUKUNAGA et al.

It is certified that error appears in the above-identified patent and that said Letters Patent is hereby corrected as shown below:

IN THE ABSTRACT, line 6: Before "analog" delete "an".

| Column | Line | |
|---|---|---|
| 1 | 21 | Change "an" to --a--. |
| 1 | 32 | After "it" insert --is--. |
| 1 | 36 | Change "tens, uV" to --tens of $\mu$V--. |
| 1 | 51 | Delete "due". |
| 1 | 53 | Change "an" to --a--. |
| 5 | 44 | Change "is" to --are--. |

UNITED STATES PATENT AND TRADEMARK OFFICE
CERTIFICATE OF CORRECTION

PATENT NO. : 5,469,746
DATED : November 28, 1995
INVENTOR(S) : Masao FUKUNAGA et al.

It is certified that error appears in the above-identified patent and that said Letters Patent is hereby corrected as shown below:

| Column | Line | |
|---|---|---|
| 6 | 19 | Delete "13". |
| 7 | 56 | After "each" insert --circuit of--; before "input/" change "a" to --an--. |
| 9 | 47 | Change "which" to --whereby--. |
| 11 | 61 | Change "stores" to --stored--. |
| 12 | 24 | Change "set" to --sent--. |
| 12 | 33 | Change "are" to --is--. |
| 12 | 48 | After "by" insert --utilizing--. |
| 12 | 51 | Change "by providing" to --because it provides--. |
| 12 | 57 | After "shown" insert --in--. |

UNITED STATES PATENT AND TRADEMARK OFFICE
CERTIFICATE OF CORRECTION

PATENT NO. : 5,469,746

DATED : November 28, 1995

INVENTOR(S) : Masao FUKUNAGA et al.

Page 3 of 4

It is certified that error appears in the above-identified patent and that said Letters Patent is hereby corrected as shown below:

| Column | Line | |
|---|---|---|
| 13 | 16 | Change "is" to --are--. |
| 14 | 24 | Change "to" to --for--. |
| 14 | 44 | Change "enough" to --sufficiently--. |
| 14 | 45 | After "current" insert --will--. |
| 14 | 60 | Change "market scan" to --markets can--; change "to" to --for--. |
| 14 | 63 | Change "hard to" to --is only slightly--. |
| 14 | 64 | Change "receive" to --affected--. |
| 14 | 68 | Change "impossible hardly occurs" to --is rarely impeded--. |

UNITED STATES PATENT AND TRADEMARK OFFICE
CERTIFICATE OF CORRECTION

PATENT NO. : 5,469,746
DATED : November 28, 1995
INVENTOR(S) : Masao FUKUNAGA et al.

It is certified that error appears in the above-identified patent and that said Letters Patent is hereby corrected as shown below:

| Column | Line | |
|--------|------|---|
| 15 | 2 | Change "excepts" to --except for--. |
| 17 | 55 | Change "methods" to --method--. |

Signed and Sealed this

Ninth Day of July, 1996

BRUCE LEHMAN

Attest:

Attesting Officer

Commissioner of Patents and Trademarks